United States Patent

[11] 3,623,600

| [72] | Inventor | Bryce D. Dell<br>Woodhaven, Mich. |
|---|---|---|
| [21] | Appl. No | 882,942 |
| [22] | Filed | Dec. 8, 1969 |
| [45] | Patented | Nov. 30, 1971 |
| [73] | Assignee | Ford Motor Company<br>Dearborn, Mich. |

[54] CONVEYING AND STORING SYSTEM FOR ELONGATED ARTICLES
7 Claims, 4 Drawing Figs.

[52] U.S. Cl. ............ 198/219, 198/19
[51] Int. Cl. .......... B65g 25/04
[50] Field of Search ............ 198/219, 19

[56] References Cited
UNITED STATES PATENTS
2,948,386  8/1960  Kay ............ 198/219

FOREIGN PATENTS
51,850  10/1966  Poland  198/219

Primary Examiner—E. A. Sroka
Attorneys—John R. Faulkner and Glenn S. Arendsen

ABSTRACT: Crankshafts for reciprocating engines are transported and stored by a mechanical conveyor. The conveyor is made up of a pair of stationary side members that have a plurality of inclines separated by a plurality of risers on the upper surfaces thereof. A pair of vertically movable intermediate members are located between the side members. The intermediate members also have a plurality of inclines separated from each other by risers, and the inclines thereof are positioned to overlap the risers of the side members. Vertical movement of the intermediate members moves the crankshafts along the conveyor. Blocking mechanisms attached to the intermediate members prevent the crankshafts from moving to the succeeding riser when a crankshaft already is located on the succeeding riser.

PATENTED NOV 30 1971

INVENTOR
BRYCE D. DELL
BY
John R. Faulkner
Glenn S. Arendsen
ATTORNEYS

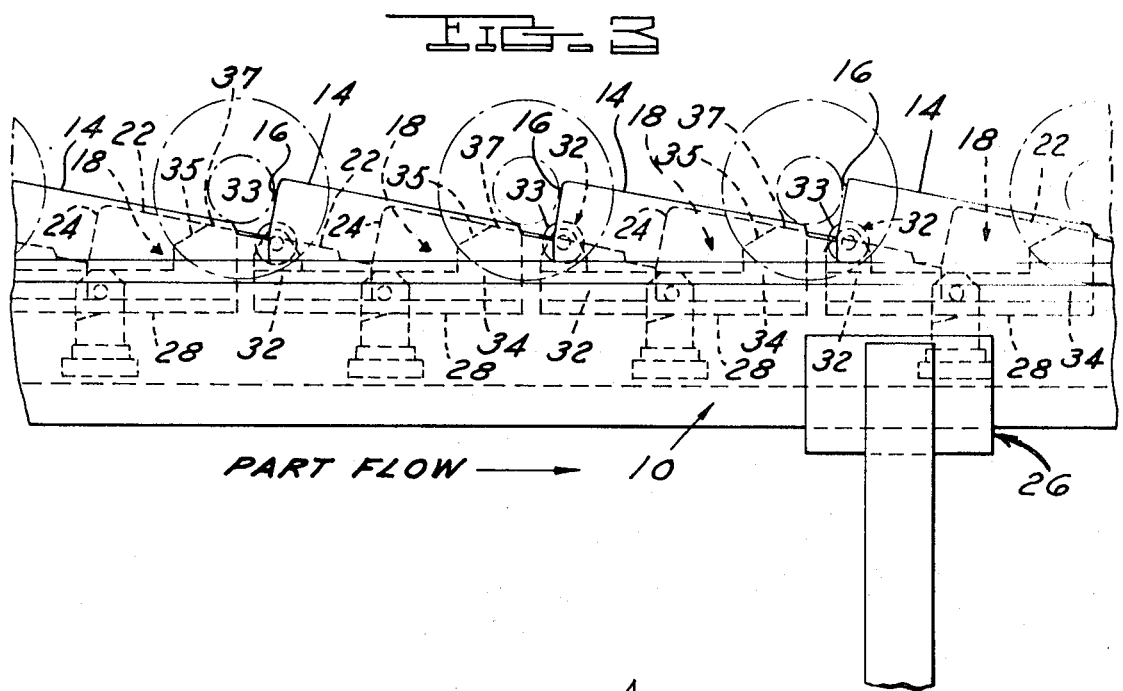
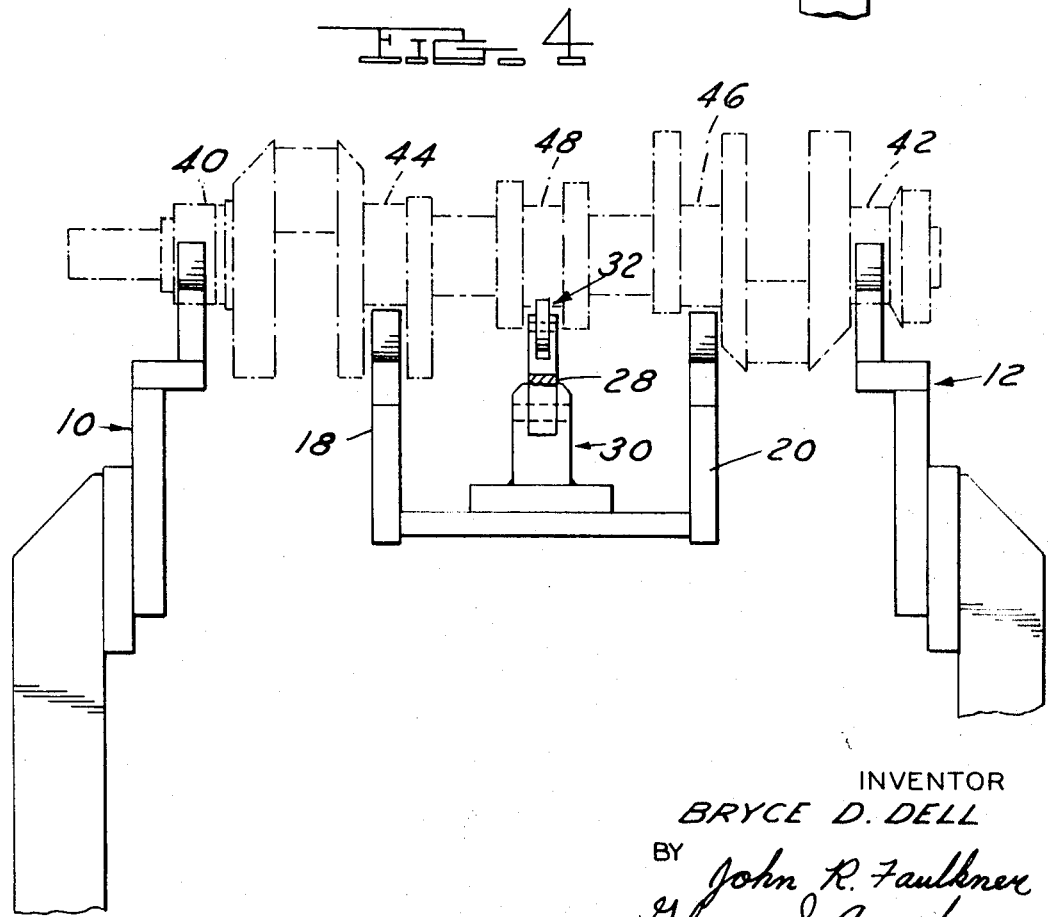

CONVEYING AND STORING SYSTEM FOR ELONGATED ARTICLES

SUMMARY OF THE INVENTION

Engine crankshafts and other relatively delicate but large elongated articles must be transported and stored in several locations during manufacturing and assembly. In the past, walking beam type-mechanisms that advance the articles on an individual basis traditionally have been used to transport such articles, especially where the articles have unusual shapes and are extremely vulnerable. Other prior art systems have pushed the articles along appropriate guide rails. The unusual shape of crankshafts, however, generally caused considerable damage to the bearing surfaces thereof during transportation by these conveying systems.

This invention provides a mechanism for transporting, storing and accumulating such articles with a minimum of damage. The conveying system requires a low amount of power and uses uncomplicated reciprocating vertical motion only. The system comprises a pair of elongated side members extending in the desired direction of movement. Each side member has a plurality of inclines on the upper surface thereof and each incline is separated from the other inclines by a riser sufficiently high to hold one of the elongated articles. A pair of intermediate members are located between the side members. The upper surfaces of the intermediate members have substantially the same incline and riser configuration of the side members, but the inclines are laterally adjacent the risers of the side members. A blocking bar is fastened pivotally to the intermediate members and has its ends spaced at sequential risers of the side members so that the downstream end portion of the bar will contact any article on the downstream riser. The riser is tilted by any such contact to bring the upstream end of the bar into a position where it blocks the transfer of an article from a riser to the succeeding incline.

BRIEF DESCRIPTION OF THE DRAWING

FIG. 3 is a side view showing in phantom the relative positions of the blocking bars.

FIG. 4 is a sectional end view showing the relationship of the side members, intermediate members and blocking bars to an engine crankshaft.

DETAILED DESCRIPTION

Figure 1:
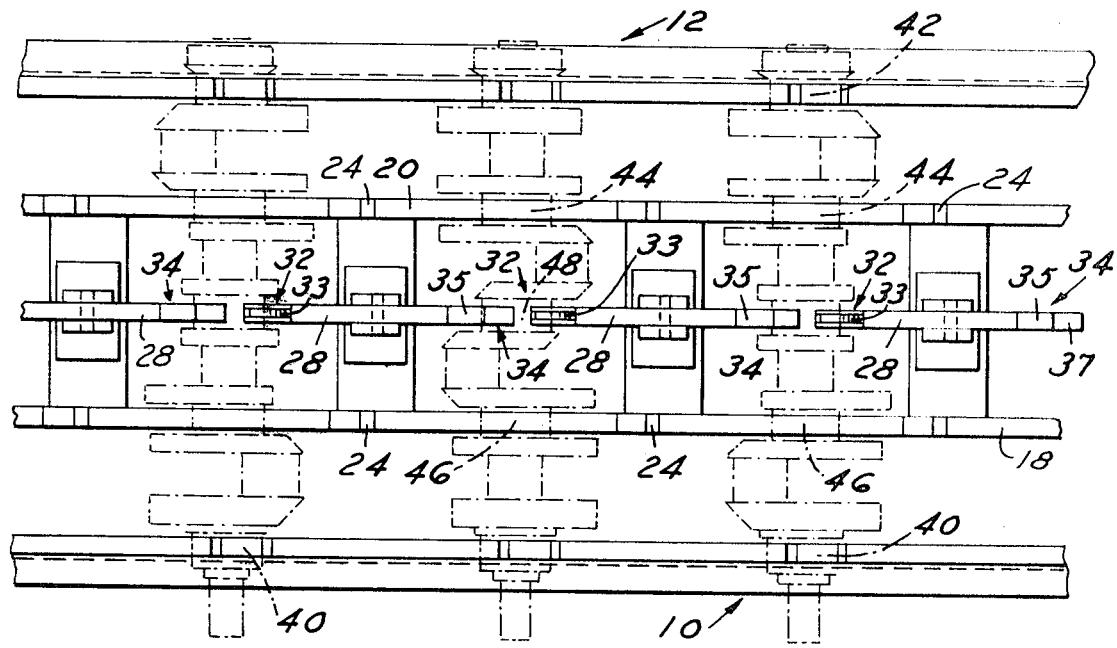
FIG. 1 is a plan view of a conveying system of this invention used to transport engine crankshafts.

Referring to the drawings, the conveying system of this invention comprises a pair of spaced side rails 10 and 12. The upper surfaces of side rails 10 and 12 have a step configuration made up of a plurality of ramps or inclined surfaces 14 and a plurality of risers 16. Inclines 14 typically are at about 10° to the horizontal and risers 16 typically extend at right angles to the incline surfaces. Shallow cutouts 17 are formed in inclined surfaces 14 at the points of intersection with risers 16 to maintain the articles being conveyed against the risers. The laterally spaced inclines and risers thus make up a plurality of longitudinally succeeding sets thereof.

Positioned between side rails 10 and 12 are a pair of intermediate rails 18 and 20. Intermediate rails 18 and 20 also have upper surfaces comprising a plurality of inclined surfaces 22 separated by a plurality of risers 24. Shallow cutouts 25 similar to cutouts 17 are formed in inclined surfaces 22 at the points of intersection with risers 24. The intermediate rails are spaced so the midpoints of inclined surfaces 22 thereof are substantially aligned laterally with risers 16 of the side rails and risers 24 are aligned substantially with the midpoints of inclined surfaces 14. A mechanism 26, which is driven typically by an electric or hydraulic motor, is connected to the intermediate rails to impart a reversing vertical motion thereto.

The vertical motion is sufficient to bring the midpoints of inclined surfaces 22 to the level of the higher ends of inclined surfaces 14 so an article lifted by the intermediate rails will roll or slide onto the inclined surfaces of the side rails.

A blocking bar 28 is mounted pivotally at 30 to intermediate members 18 and 20. Each blocking bar is positioned so the upstanding ends 32 and 34 thereof are positioned approximately in the lateral line of succeeding side rail risers 16. Each end 32 is upstream of the pivot point of its blocking bar while each end 34 is downstream thereof. A roller 33 is mounted on each upstream end 32. The downstream ends have relatively obtuse points formed thereon by surfaces 35 and 37.

Side rails 10 and 12 are spaced sufficiently far apart for the inclined surfaces and risers thereon to contact the outer main bearings 40 and 42 of an engine crankshaft (See FIGS. 1 and 4). Intermediate rails 18 and 20 are spaced to contact intermediate bearing surfaces 44 and 46, and blocking bar 28 is spaced to contact a center bearing surface 48. In operation, a crankshaft is placed on the initial pair of inclined surfaces 14 and is permitted to slide or roll down the incline surfaces to the first pair of risers 16. Cutouts 17 hold the crankshaft against the risers. Vertical movement of intermediate rails produced by mechanism 26 lifts the crankshaft above the pair of risers 16 and permits the crankshaft to roll onto the succeeding pair of inclined surfaces 14. The crankshaft rolls down inclined surfaces 14 and 24 until intermediate bearing surfaces 44 and 46 contact risers 24. Intermediate rails 18 and 20 then are retracted to permit the crankshaft to reach the succeeding pair of risers 16. Continued vertical up and down movement of intermediate rails thus advances the crankshaft along the conveyor.

Figure 2:
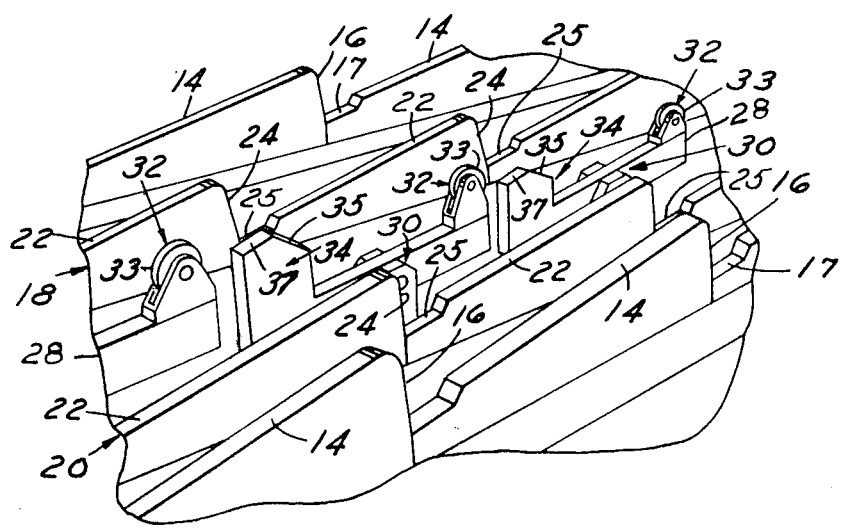
FIG. 2 is a perspective view of the conveying system showing the relative positions of the blocking bars to the intermediate and side members.

Severe damage can result to certain types of crankshafts if more than one crankshaft is placed on any one pair of inclined surfaces at the same time. The mechanism of this invention prevents this occurrence by virtue of the operation of blocking bars 28. When a crankshaft has reached the end risers of side rails 10 and 12, the downstream end of the blocking bar 28 associated with the end riser contacts the crankshaft. If the crankshaft is not removed upon the next upward movement of intermediate rails 18 and 20, the downstream end 34 of the blocking bar associated with the end risers remains in contact with the crankshaft. This contact depresses the downstream end slightly and thereby pivots the blocking bar slightly counterclockwise in FIG. 2. Upstream end 32 of the blocking bar thus is tilted upward so roller 33 contacts the crankshaft on the preceding pair of risers 16 at a point sufficiently high to prevent the crankshaft located there from rolling onto inclined surfaces 14 even though the crankshaft has been lifted to the level of the highest point of surfaces 14.

If a crankshaft is being held on a pair of downstream risers but no crankshaft is located on an intermediate pair of risers, the blocking bar of the intermediate risers permits advancement of a crankshaft on the next preceding pair of risers since the upstream end of the blocking bar is in its lower position. Thus the mechanism accumulates crankshafts to fill any gaps existing on the conveyor but prevents accumulation of more than one crankshaft on the same pair of inclined surfaces. Any accidental accumulation on the same pair of inclined surfaces is eliminated automatically by the mechanism when advancement again commences. The bars are mounted so the downstream ends are normally in a raised position, and surfaces 35 permit a crankshaft to depress the bar as the crankshaft rolls into contact therewith. If the articles being conveyed can tolerate accumulation on the inclined surfaces, the blocking bars are omitted and such accumulation occurs automatically to fill the entire length of the inclined surfaces of side rails 10 and 12.

Pads of impact adsorbing polymeric materials such as polyurethanes can be applied to the surface of the inclines and risers to prevent damage to the delicate crankshaft bearing surfaces. The spacing of risers 16 and 24 also prevents the crankshafts from achieving a speed in rolling down the inclines that could damage the crankshaft when it stops at the risers.

Thus this invention provides a conveying system for transporting, storing and accumulating delicate elongated articles. The conveying system requires a minimum investment and utilizes relatively low amounts of power. Because of its relatively simple mechanical movements, the conveying system is relatively free of operating and maintenance costs.

I claim:

1. A conveying system for transporting and storing elongated articles comprising elongated side members positioned in the desired direction of movement of said articles, said side members having a plurality of lateral sets of inclines on the upper surfaces thereof, each of said sets of inclines being separated from each adjacent set by a set of risers sufficiently high to hold one of said elongated articles, intermediate members located between said side members, said intermediate members also being elongated in the direction of movement and having a plurality of upper surfaces located to overlap said risers of said side members, means for moving vertically said intermediate members relative to said side members sufficient to raise one of said elongated articles above a set of risers so said article tends to move onto the succeeding set of inclines, and blocking means sensing the presence of an article at a succeeding set of risers of said side members, said blocking means preventing advancing movement of an article on a preceding set of risers when an article is sensed on a succeeding set of risers, but permitting movement when no article is sensed on the succeeding set of risers, said blocking means comprising an elongated bar pivotally mounted to said intermediate members, said bar having end portions spaced adjacent sequential risers of said side members, the downstream end portion of said bar being located to contact any article on the downstream set of risers and the upstream end portion having a roller mounted thereon, said contact pivoting said bar so the roller on the upstream end portion contacts any article on the preceding set of risers to prevent the latter article from moving onto the succeeding set of inclines.

2. The conveying system of claim 1 in which the upper surfaces of the intermediate members are inclined in the direction of movement and the inclined surfaces thereof are separated from each other by risers, said risers of said intermediate members being spaced between the risers of the side members.

3. The conveying system of claim 2 comprising polymeric pads on the inclines and risers.

4. The conveying system of claim 3 comprising cutouts on the inclined surfaces at the points of intersection with the risers to hold the articles being conveyed against the risers after the articles have moved down the inclined surfaces.

5. The conveying system of claim 4 in which the articles being conveyed are crankshafts for reciprocating machines, said crankshafts contacting said side members and intermediate members with the bearing surfaces of said crankshafts.

6. The conveying system of claim 1 in which the upper surfaces of the intermediate members are inclined in the direction of movement and the inclined surfaces thereof are separated from each other by risers, said risers of said intermediate members being spaced between the risers of the side members.

7. The conveying system of claim 1 comprising cutouts on the inclined surfaces at the points of intersection with the risers to hold the articles being conveyed against the risers after the articles have moved down the inclined surfaces.

* * * * *